US007146932B2

(12) United States Patent
Willinger et al.

(10) Patent No.: US 7,146,932 B2
(45) Date of Patent: Dec. 12, 2006

(54) BIRDCAGE WITH WATER AND FEEDER ASSEMBLY

(75) Inventors: Jonathan Willinger, Teterboro, NJ (US); Ryan Rutherford, Teterboro, NJ (US); Klaus Woltmann, Teterboro, NJ (US)

(73) Assignee: JW Pet Company, Inc., Teterboro, NJ (US)

( * ) Notice: Subject to any disclaimer, the term of this patent is extended or adjusted under 35 U.S.C. 154(b) by 0 days.

(21) Appl. No.: 11/207,040

(22) Filed: Aug. 18, 2005

(65) Prior Publication Data

US 2006/0005780 A1 Jan. 12, 2006

Related U.S. Application Data

(60) Provisional application No. 60/668,352, filed on Apr. 5, 2005.

(51) Int. Cl.
A01K 31/08 (2006.01)
A01K 39/04 (2006.01)

(52) U.S. Cl. ....................... 119/461; 119/463
(58) Field of Classification Search ........ 119/461, 119/462, 463, 464, 465, 467
See application file for complete search history.

(56) References Cited

U.S. PATENT DOCUMENTS

| 1,227,814 | A | * | 5/1917 | Maxwell | 119/461 |
| 1,794,718 | A | * | 3/1931 | Little | 119/463 |
| 5,000,121 | A | * | 3/1991 | Daily | 119/461 |
| 5,152,247 | A | * | 10/1992 | Brown | 119/464 |
| 5,626,098 | A | * | 5/1997 | Askins et al. | 119/461 |
| 5,771,838 | A | * | 6/1998 | Bloom et al. | 119/464 |
| 5,957,086 | A | * | 9/1999 | Gallardo | 119/463 |
| 6,129,052 | A | * | 10/2000 | Huang | 119/461 |

* cited by examiner

Primary Examiner—Teri Pham Luu
Assistant Examiner—Elizabeth Shaw
(74) Attorney, Agent, or Firm—Katten Muchin Rosenman LLP

(57) ABSTRACT

A birdcage is disclosed that includes a collapsible cage having an opening adapted to be coupled to a support wherein the support is adapted to support at least one of a feeder and a waterer so that a bird in the cage may be provided at least one of food and water while being blocked from exiting the cage via the opening. The birdcage also includes a base adapted to receive and support the cage, wherein the base includes side walls that extend out beyond a perimeter of the cage and are flared upwardly and outwardly relative to the cage so as to be disposed to catch debris expelled from within the cage.

21 Claims, 15 Drawing Sheets

BIRDCAGE WITH WATER AND FEEDER ASSEMBLY

CROSS-REFERENCE TO RELATED APPLICATIONS

The present invention claims priority to U.S. Provisional Patent Application No. 60/668,352 entitled "BIRDCAGE WITH WATER AND FEEDER ASSEMBLY" filed on Apr. 5, 2005, which is hereby incorporated by reference herein in its entirety for all purposes.

BACKGROUND OF THE INVENTION

1. Field of the Invention

The present invention relates to animal cages, and more particularly to a birdcage including water and feeder assemblies.

2. Background

In a hurried modern world, pets bring relief and joy to countless millions of people. Among the more popular pet companions are birds. To keep their cherished family members safe and secure, bird owners use birdcages.

One of the most common problems in bird-keeping today is failing to provide pet birds with the environment, which closely imitates their natural environment. For example, housing birds in an undersized cage can lead to all of the worst behavioral problems found in pet birds: screaming, phobic behavior, biting and aggression, and feather plucking. A common misconception is that a cage is a place of confinement. However, a cage is a home and comfort zone, similar to the way people view their own homes. This is where the food is kept and where the familiar waterer hangs. When birds are under stress, many owners may probably notice that the birds are most relieved when returned to their cage. Pet birds typically spend the vast majority of their time housed within these four walls. Not confining birds at all may be extremely dangerous.

Even if the birds are housed in a cage having striking similarities with their natural environment, they still may not be entirely comfortable. The pet owner must provide water and food in a manner suitable to the birds. Questions that must be answered include: Where will the birds get their water? How will a feeder be configured? Thus, it is impossible to provide pet birds with a proper, safe, and comfortable living environment without paying attention to numerous details.

The most obvious consideration when designing a cage is the size of the bird. Another factor that often gets overlooked when looking at cages is that these cages will be occupied by not only the pet birds but also food bowls, waterers and whatever else the owner decides to provide for the birds. These accessories, some of which are absolutely necessary, may dramatically reduce the amount of open space in the cage.

Another important determinant, as is discussed above, is the birds' natural habits. One habit of birds that bird owners frequently find frustrating is that captive birds are very fussy with their food. Typically, birds will peck at the offering searching for the perfect seed and thereby displace the other seeds. At other times, birds will crack a seed and shake it until the husk is discarded, typically out of the cage.

Unfortunately, many known cages are poorly configured to deal with this problem. Thus, the food and other debris often fly from the birdcage and litter an area surrounding the birdcage.

Besides the bird-related issues, birdcages are also an element of interior design within the pet owners home or office and, thus, it is highly desirable for birdcages to be functional but also aesthetically appealing.

Furthermore, the known structures of the birdcage may be complicated and include multiple components that are not easily assembled. Typically, a birdcage is provided with feeder and waterer units. Some of the prior art birdcages have such units integrally provided with a cage frame. Cleaning and refilling these units with water and food involve significant inconvenience for the pet owner. Other birdcages may be configured with removable feeder and waterer units. However, dismounting these units from, and subsequently mounting them back to, the birdcage may not be an easy task due to the configuration of the known feeder/waterer units.

A need, therefore, exists for birdcages structured to provide pet birds with a comfortable environment.

Still a further need exists for birdcages with a structure that is easy to assemble and disassemble in a time-efficient manner.

Yet a further need exists for birdcages with a structure that facilitates easy attachment of feeder and waterer units to the birdcages.

SUMMARY OF THE INVENTION

A birdcage configured in accordance with the present invention successfully addresses these needs. In some embodiments of the invention, the birdcage includes five main components or units including a collapsible cage, a base, a feeder, a waterer, and a feeder/waterer support, which are easily joined to one another in a time-efficient manner. The collapsible cage may be placed on the base, which is shaped and dimensioned to provide a stable structure that also reduces the spillage of food debris produced by the resident bird. The feeder/waterer support can be removably mounted to the cage and configured to receive both the feeder and waterer units in a simple manner requiring minimal installment efforts on the part of the user. Structured to have only a feeder and water cup protruding inside the cage, both the feeder and waterer units leave plenty of space inside the cage for pet birds.

In some embodiments, the base includes a base top, which is provided with flared walls, a base bottom, which supports the base top, and a tray for collecting debris. Besides stabilizing other cage components when the birdcage is in an assembled state, the flared walls are dimensioned to minimize the amount of food and other debris, which fly from the cage on the floor surrounding the birdcage.

Furthermore, the birdcage is collapsible so that one or more walls are disposed against one or more opposing walls in the collapsed state.

The feeder/waterer support is detachably coupled to the cage and is provided with windows, which are adapted to receive the feeder and waterer units. When the food and water supplies need to be replenished and the feeder and waterer units are removed to do so, shutters, which are slidably mounted on the support, move to cover the windows, thus, preventing the pet birds from exit out of the cage via the windows. In another embodiment of the inventive birdcage, the feeder unit is suspended from the top of the cage. Placed in the cage, the feeder unit provides the bird owners with an unobstructed view of the birds while they are eating, which many bird owners enjoy. These and other features and aspects of the present invention will be better

BRIEF DESCRIPTION OF THE DRAWINGS

FIG. 3b illustrates an exploded view of the base, as shown in FIG. 3a.

FIG. 4b illustrates a first side view of the base, as shown in FIG. 4a.

DETAILED DESCRIPTION

Figure 1:
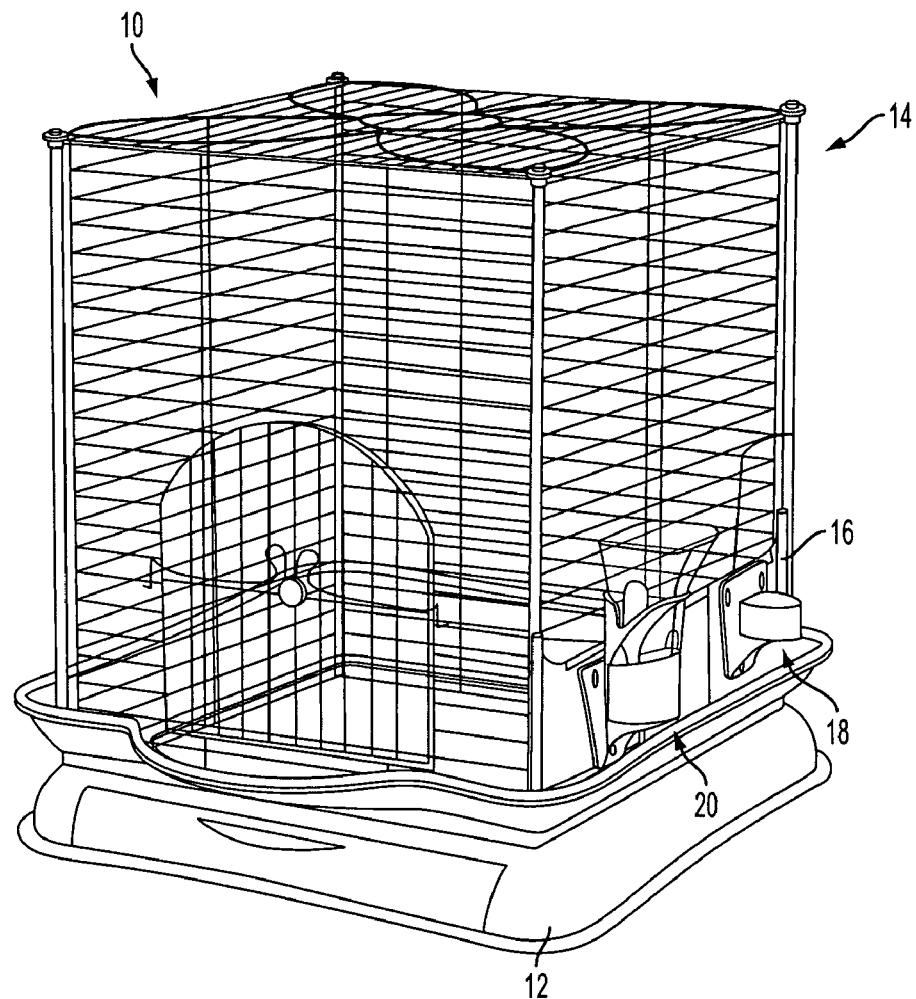
FIG. 1 illustrates an isometric view of the inventive birdcage assembly.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, left, right, up, down, over, above, below, beneath, rear, and front may be used with respect to the drawings. These and similar directional terms should not be construed to limit the scope of the invention in any manner. The words "attach," "connect," "couple," and similar terms with their inflectional morphemes do not necessarily denote direct and immediate connections, but also include connections through mediate elements or devices.

Figure 2:
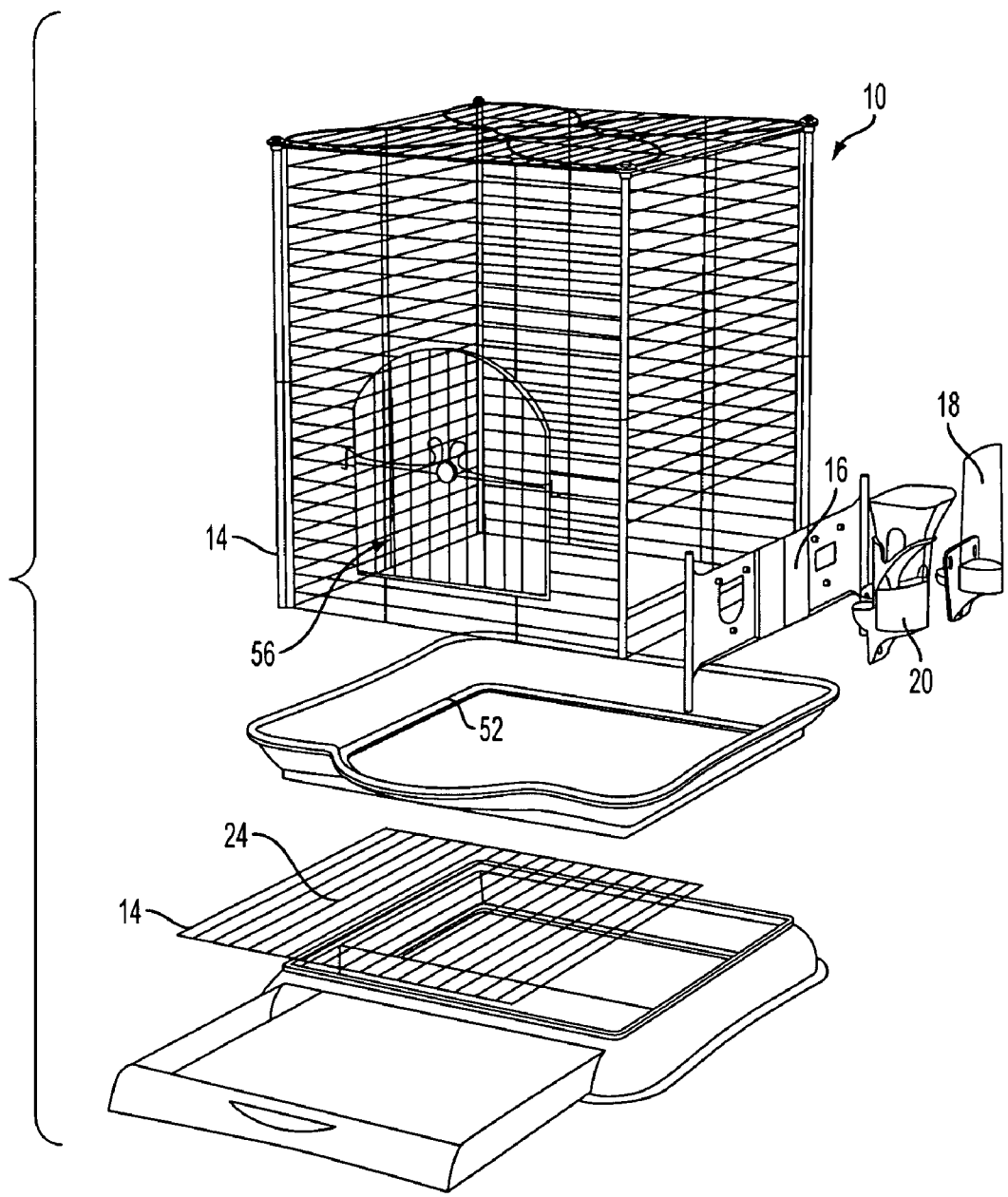
FIG. 2 illustrates an exploded view of the birdcage assembly, as illustrated in FIG. 1.
Figure 3A:
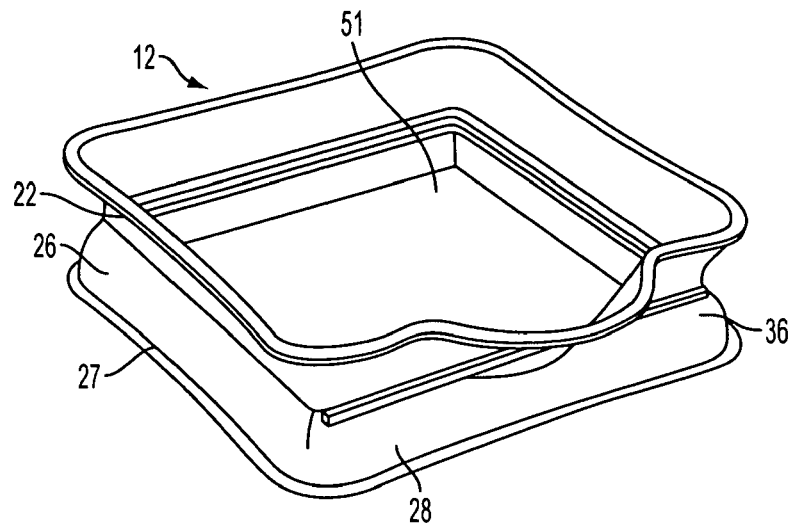
FIG. 3a illustrates an isometric view of the base of the inventive birdcage assembly, illustrated in FIGS. 1 and 2.
Figure 3B:
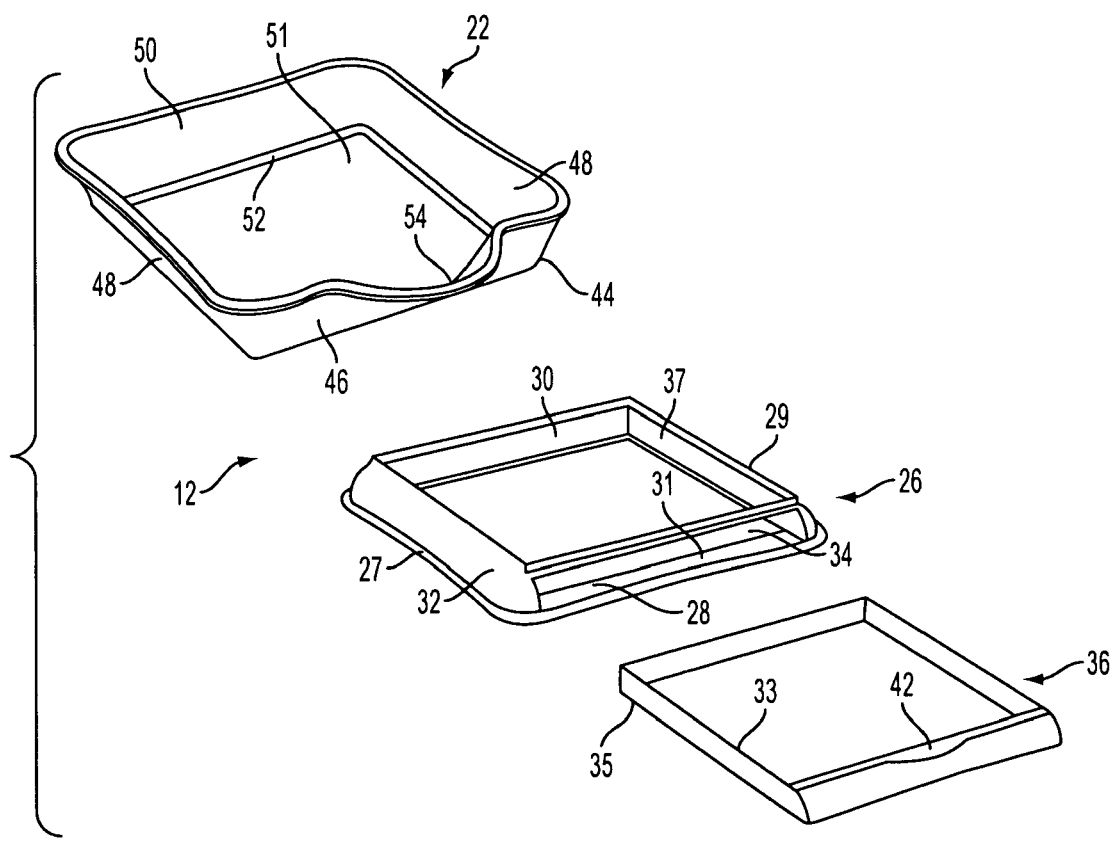
Figure 4A:
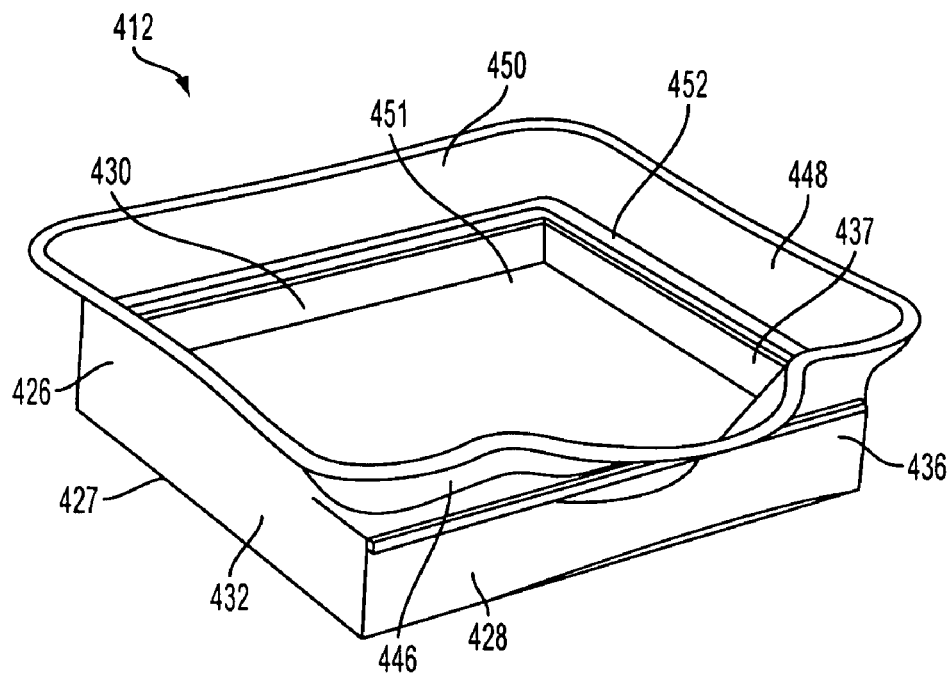
FIG. 4a illustrates an isometric view of a further embodiment of the base of the inventive birdcage assembly, illustrated in FIGS. 1 and 2.
Figure 4B:
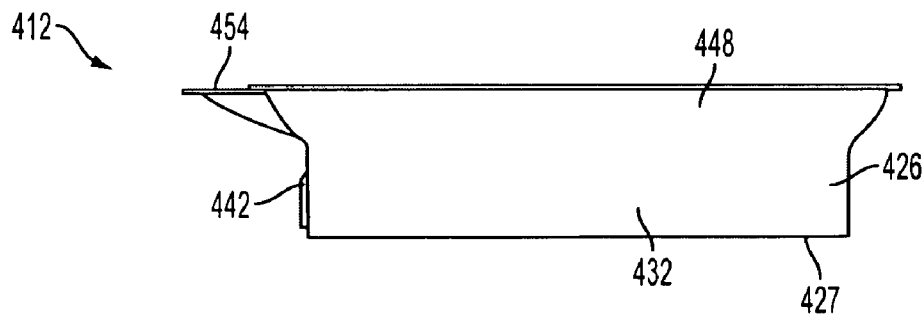
Figure 4C:
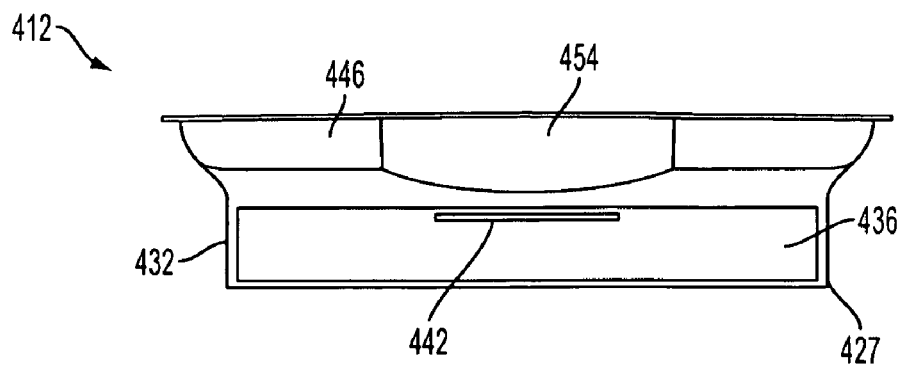
FIG. 4c illustrates a second side view of the base rotated 90 degrees from the view shown in FIG. 4b.
Figure 5:
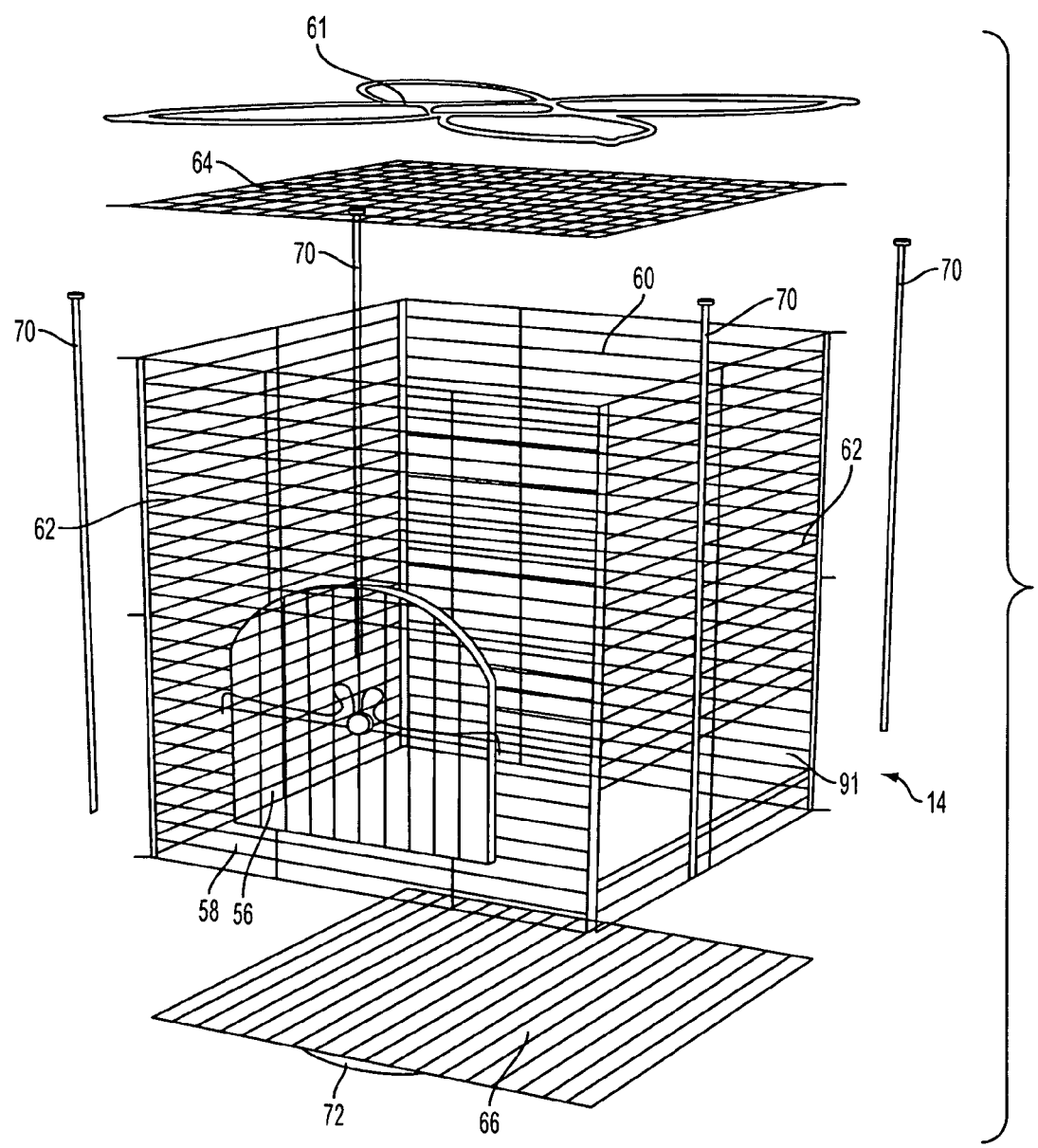
FIG. 5 illustrates an exploded view of the cage of the birdcage assembly, as illustrated in FIG. 1.
Figure 6:
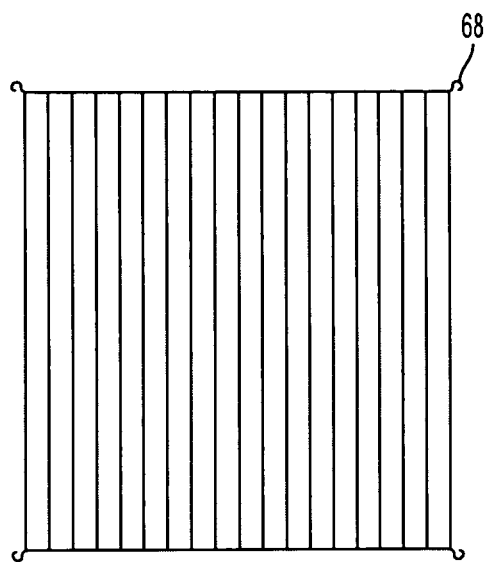
FIG. 6 illustrates the top wall of the birdcage assembly of FIG. 5.
Figure 7:
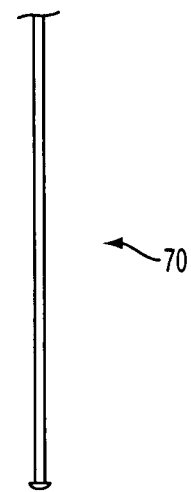
FIG. 7 illustrates a connecting rod for coupling the walls, top frame and base of the birdcage together in the assembled state of the birdcage.

FIGS. 1 and 2 illustrate a birdcage 10 including a base 12, a cage 14, which is supported on base 12, feeder/waterer support 16, waterer 18 and feeder 20. The cage 14 may include wire mesh top and side walls as well as a bottom wall 24 or bottom grill. The side walls may be collapsible such that the birdcage 10 may be disassembled and/or folded flat as will be described in more detail below. Advantageously, the birdcage can be shipped from manufacturer to retailer in a flat pack wherein it is in a collapsed or flat panel state. A consumer may then easily transport the flat pack home and assemble the birdcage. Of course, the birdcage may also be easily dissembled or collapsed for storage and/or further transport.

We now turn to each individual component of birdcage 10, and particularly to base 12, better illustrated in FIGS. 2, 3a–3b and 4a–4c. Functionally, base 12 is configured to provide birdcage 10 with stability and to minimize littering the area, which surrounds assembly 10, with debris from cage 14. The base may be made from plastic (e.g., colored ABS, other polymers, compounds, etc.), metal (e.g., aluminum, steel, etc.), or any suitable material.

Structurally, base 12 comprises three major elements including a base bottom 26, a tray 36 or pan which is configured to collect debris for convenient disposal, and a base top 22. Base bottom 26 (FIG. 3b) has a box-like configuration with an open top and open bottom, both of which are defined between front wall 28, rear wall 30 and a pair of sidewalls 32. A bottom peripheral edge 27 (FIGS. 3a and 3b) of base bottom 26 is typically placed on a flat surface and provides a balanced support for the rest of the base components.

Front wall 28 (FIGS. 3a–3b) of base bottom 26 has a recess 34 shaped and dimensioned to allow tray 36 to slide in and out from the base bottom along a linear path. Dimensions of recess 34 and tray 36 are selected so that the tray is guided along inner sides 37 of sidewalls 32 of base bottom 26, which, thus, limit lateral deviation of tray 36 from the linear path.

To minimize displacement of tray 36 in base bottom 26 in a vertical plane, each wall 28, 30 and 32 of the base bottom is defined between respective portions of endless upper and lower edges 27, 29 (FIG. 3b) and, thus, has a respective generally I-shaped cross-section. Portions of edges 27 and 29, flanking sidewalls 32 of base bottom 26 in a vertical plane, form lips each located adjacent to a respective one of upper and lower edges 33 and 35 (FIG. 3b), respectively, of tray 36. During displacement of tray 36 in base bottom 26, lower edge 35 of tray 36 slides along the lower lips 31 of edge 27 of base bottom 26, whereas the lips of upper edge 29 of base bottom 26 limit vertical displacement of tray 36. In a fully inserted position, the rear wall of tray 36 abuts the inner side of rear wall 30 of base bottom 26 completing, thus, the alignment of tray 36 in base bottom 26.

To facilitate insertion of tray 36 into base bottom 26, the tray's front side is provided with a handle 42 (FIG. 3b), which is ergonomically designed and can be conveniently held by the user. To complete assembly of base 12, bottom base 26 is dimensioned to receive base top 22 so that a bottom edge 44 (FIG. 3b) of base top 22 snaps fit into place with the interior portion of upper edge 29 of base bottom 26. Thus, in the assembled state of base 12, base top and bottom 22 and 26, respectively, remain displaceably fixed relative to one another, even if either of these components is accidentally or intentionally moved. Note that the cross-section of entire base 12 is illustrated in the drawings as rectangular, but may be modified to have any other regular or irregular shape.

Walls 46, 48 and 50 of base top 22 flair upwards and extend beyond the perimeter of cage 14, after the latter has been mounted on base 12, for catching the debris falling out of cage 14. Typically, such debris are shells of seeds that the resident bird has separated from the meat and now flings about the cage's vicinity mostly landing on the owner's floor. Advantageously, in the present invention the flared walls catch the debris and direct it to tray 36 for convenient disposal.

Front wall 46 is further provided with a nose 54 extending frontward from wall 46 and providing a support for a cage door 56 (FIG. 2), when the latter is fully open, as will be explained in detail herein below. The bottom of the inner side of walls 46, 48 and 50 has an inner edge 52 (FIGS. 2 and 3b) extending inwards from these walls and dimensioned to support cage 14.

In further embodiment, the base comprises only a single structure and a tray. Therein structurally, base 412 (FIG. 4a) comprises two major elements including a base portion 426, which incorporates both the base bottom portion and base top integrally formed togeather, and a tray 436 or pan, which is configured to collect debris for the bird owners' further and convenient disposal. Base portion 426 (FIGS. 4a–4c) has a box-like configuration with an open top and closed bottom, both of which are defined between front wall 428, rear wall 430 and a pair of sidewalls 432. A bottom peripheral edge 427 (FIGS. 4a–4c) of base portion 426 is typically placed on a flat surface and provides a balanced support for the rest of the base components.

Front wall 428 of base portion 426 has a recess 434 shaped and dimensioned to allow tray 436 to slide in and out from the base bottom along a linear path. Dimensions of recess 434 and tray 436 are selected so that the tray is guided along inner sides 437 of sidewalls 432, which, thus, limit lateral deviation of tray 346 from the linear path.

In a fully inserted position, the rear wall of tray 436 abuts the inner side of rear wall 430. To facilitate insertion of tray 436 into base portion 426, the tray's front side is provided with a handle 442, which is ergonomically designed and can be conveniently held by the user.

Walls 446, 448 and 450 are disposed on top of respective walls and extend beyond the perimeter of cage 14, after the latter has been mounted on base 412, for catching the debris falling out of cage 14. Typically, such debris are shells of seeds that the resident bird has separated from the meat and now flings about the cage's vicinity mostly landing on the owner's floor. Advantageously, in the present invention the flared walls catch the debris and direct it to tray 436 for convenient disposal.

Front wall 446 is further provided with a nose 454 extending frontward from wall 446 and providing a support for a cage door 56 (FIG. 2), when the latter is fully open, as will be explained in detail herein below. The bottom of the inner side of walls 446, 448 and 450 has an inner edge 452 (FIG. 4a) extending inwards from these walls and dimensioned to support cage 14.

Figure 8:
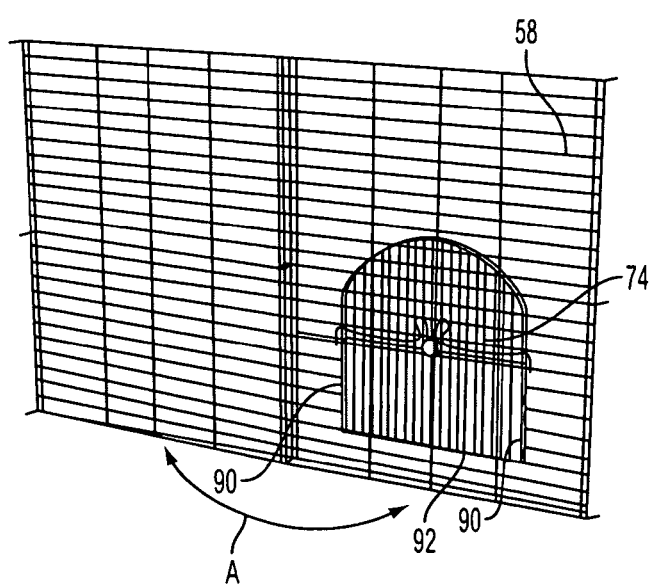
FIG. 8 illustrates a perspective view of a partially collapsed cage of FIG. 5.
Figure 9:
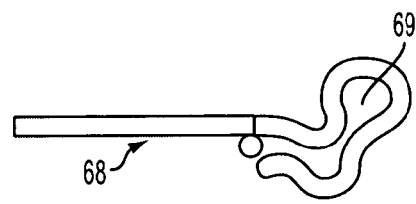
FIG. 9 illustrates an isometric view of an eyelet formation provided on the corners of the top frame of the cage and traversed by connecting rods, one of which is shown in FIG. 7.

Cage 14 may have various shapes including, for example, a polygonal one, as illustrated in FIGS. 1, 2, 5–9 and 21, which show side walls E slightly tapering towards the bottom of the cage. In various embodiments, cage 14 includes sidewalls E, front wall F, rear wall D, top wall B and bottom grill or wall I (FIG. 5), which are also referenced 62, 58, 60, 64 and 66, respectively. The cage 14 can be easily folded by initially detaching reinforcing frame A or 61, top wall 64 and bottom wall 66 from the rest of the walls. Further, the front, rear and sidewalls of cage 14 pivot relative to one another in a known manner until the cage assumes an open-book position, as shown in FIG. 8. Finally, pivoting the walls, as indicated by an arrow A in FIG. 8, allows cage 14 to assume a folded position, in which walls are disposed against one another.

Simply mounting the unfolded cage on base 12 atop the inner edge 52 (FIGS. 2, and 4) of base top 22 may be sufficient for providing the birdcage with the desirable stability under normal circumstances. However, to withstand substantial external forces tending to displace cage 14 and base 12 relative to one another, birdcage 10 further has connecting rods C or 70 (FIGS. 5, 7) traversing eyelet formations 68 (FIG. 9), which are located in the corners of cage sidewalls 62, top 64, reinforcing top frame 61 of cage 14 and finally engaging a socket in the base top 22 of the base 12. Accordingly, in the assembled state of birdcage 10, base 12 cage 14 and reinforcing frame 61 are interlocked and cannot move relative to one another. Connecting rods 70 are dimensioned to freely slide through eyelet openings 69 of formations 68 during assembly. In one embodiment after assembly, connecting rods 70 can be easily pulled out, when the user wants to disassembled birdcage 10 and reinforcing top frame 61 is easily detachable from the cage walls while providing the cage with additional stability and aesthetic appeal. In a further embodiment after assembly, connecting rods 70 are not removable to disassemble birdcage 10 and reinforcing top frame 61 is fixedly mounted.

Bottom wall 66 of cage 14, like the rest of the cage walls, is provided with a plurality of spaced apart bars and functions as a grid or grill floor fully covering an opening 51 (FIG. 3b), which is formed in base top 22. Accordingly, debris, especially from food wastes, may freely fall between the bars of bottom wall 66 through opening 51 (FIGS. 3a–3b) and be collected in tray 36. Preferably, bottom wall 66 of cage 14 has a handle 72 (FIG. 5) extending into nose 54 (FIG. 3b) of base top 22 and configured to be grabbed by the user for lifting cage 14 from base 12. In addition, handle 72 supports cage door 56 (FIG. 5), when the latter is being retracted into the cage, as will be explained below.

Figure 10A:
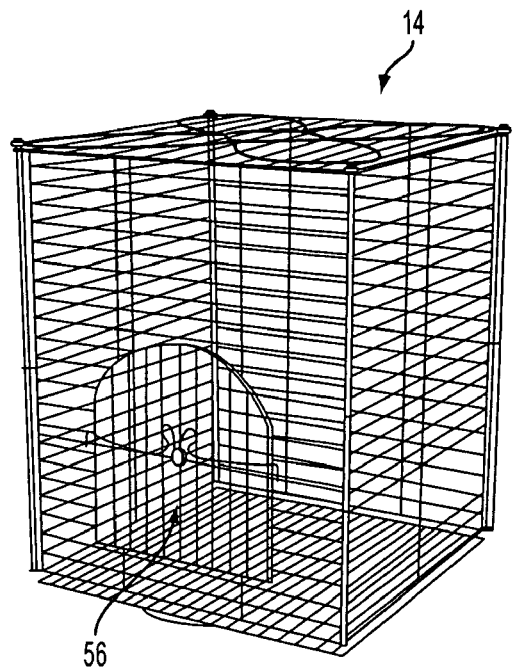
FIGS. 10A, 10B, 10C and 10D illustrate sequential stages of a door opening operation allowing access into the cage, as shown in FIG. 5.
Figure 10B:
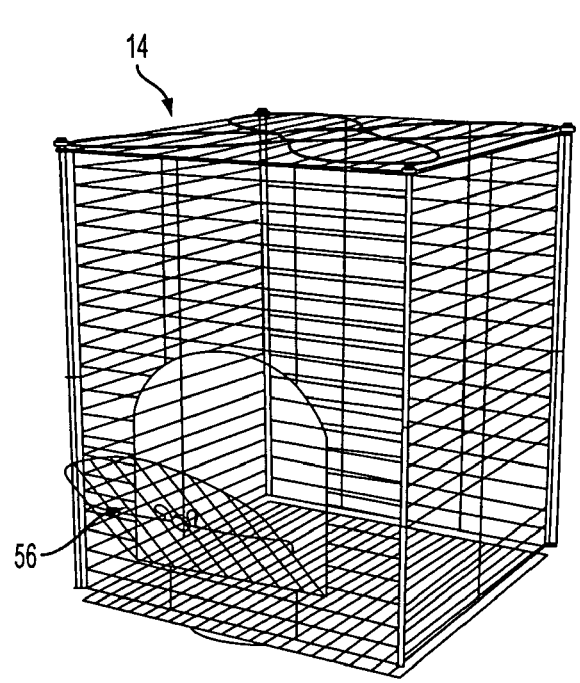
Figure 10C:
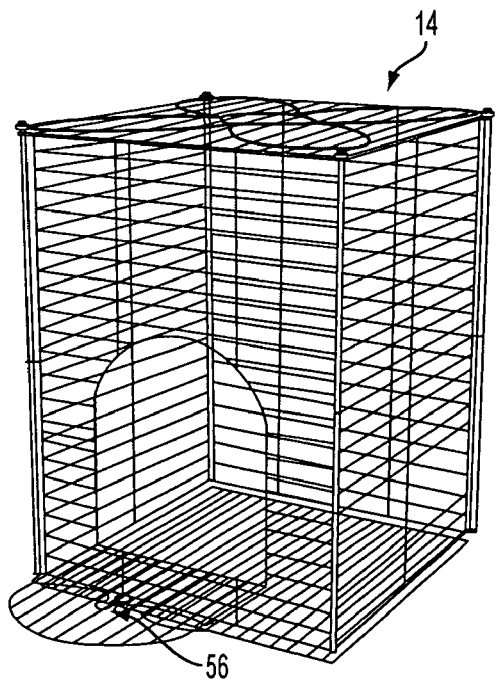

Door 56 of cage 14, which is configured to provide access into the interior of cage 14, is pivotally mounted to front wall 58 and has a pinch latch assembly 74 (FIG. 8) allowing the user to unlock door 56. Once unlocked, door 56 can be pivoted from a closed position, as shown in FIG. 10A, through a partially open position of FIG. 10B to a fully open position, as illustrated in FIG. 10C, in which it may be supported by nose 54 of base top 22 and handle 72 of cage's bottom wall 66.

Figure 10D:
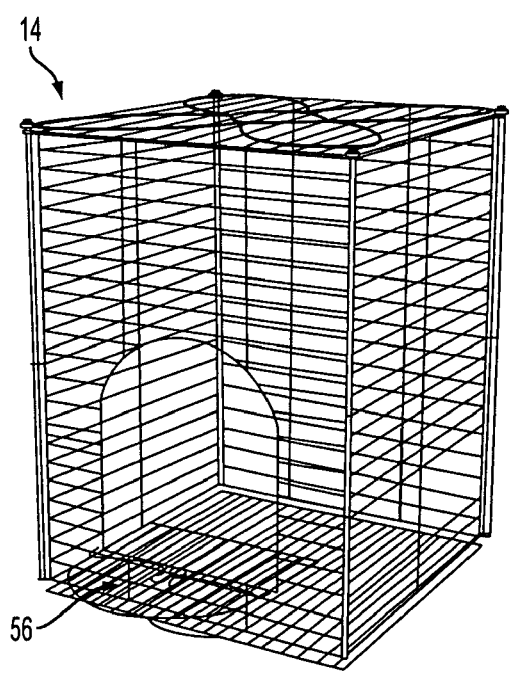
Figure 12:
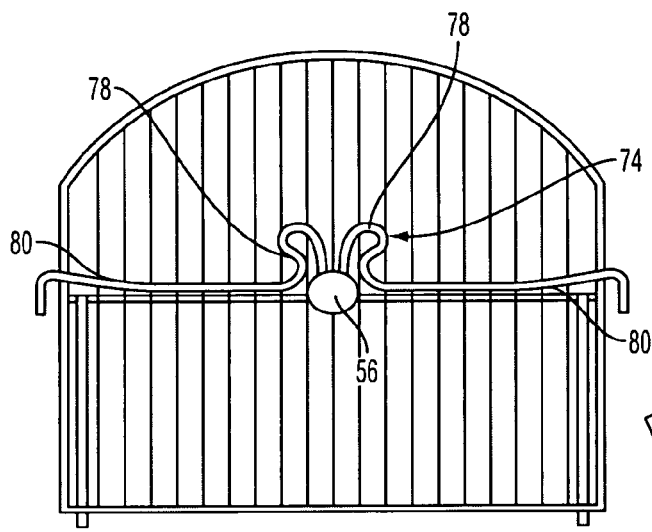
FIG. 12 illustrates a front elevation view of the door assembly, as illustrated in FIGS. 10A–10D.

In the fully open position, door 56 can be guided into cage 14 to a retracted position, as shown in FIG. 10D. The retracted position of door 56 allows for use of many accessories, such as a birdbath, which can be inserted through the door opening, as will be explained below in reference to FIGS. 20 and 21.

Figure 13A:
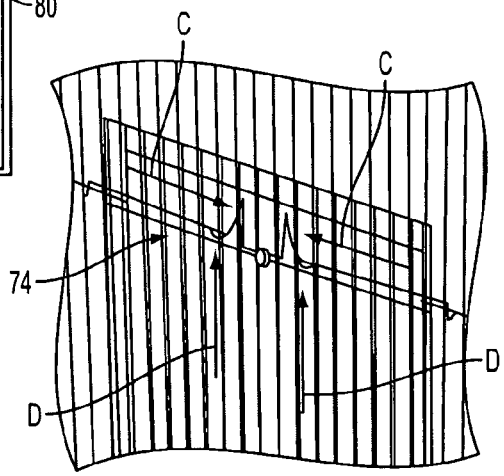
FIGS. 13A, 13B and 13C illustrate a schematic view illustrating the operation of a pinch latch of the door assembly, as shown in FIGS. 10A–10D.
Figure 13B:
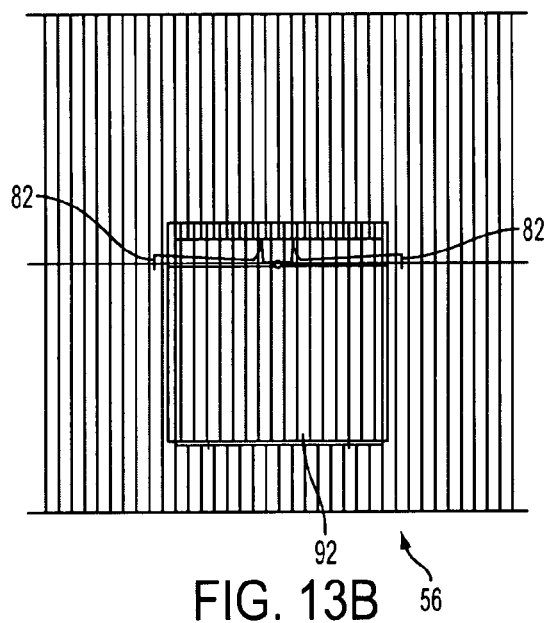
Figure 13C:
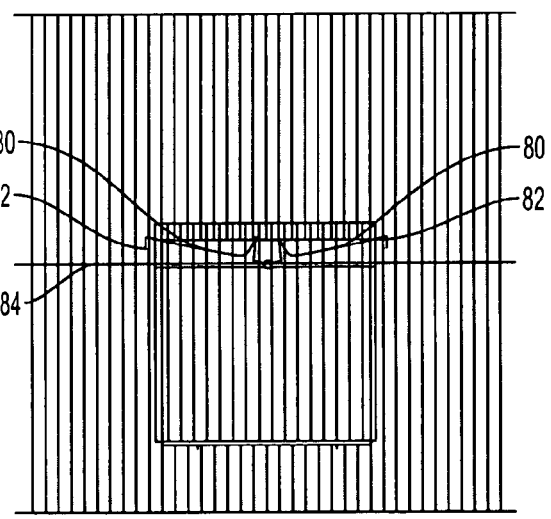

To unlock door 56, as illustrated in FIGS. 12 and 13A, 13B and 13C, the user applies a force to each of inner ends 78 of arms 80 of pinch latch assembly 74 in a direction indicated by arrows C—C. As a result, arms 80 each pivot about a respective inner end 78, as illustrated in FIG. 13C, so that arms' outer ends 82 are lifted upwards from a crossbar 84, which is fixed to front wall 58 of cage 14. Then, the user swings unlocked door 56 to its open position, as illustrated in FIG. 10C. Door 56 may be also unlocked by applying a force in a direction indicated by arrows D—D (FIG. 13A), which would cause arms 80 to pivot, thereby disengaging their outer ends 82 from crossbar 84 of cage's front wall 58.

Figure 11:
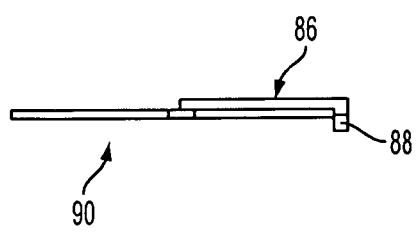
FIG. 11 is an enlarged view of a slide of the door assembly shown in FIG. 8.

Sides 90 of door 56 (FIGS. 8 and 11) each are formed with a respective guide track 86 and end hook portion 88 (FIG. 11), which is pivotally mounted on a bar 92 (FIGS. 8 and 13B) of front wall 58. In the open position of door 56, bar 92 is displaced from hook portion 88 into guide tracks 86. To retract door 56 into cage 14, the user applies a force, which is directed perpendicular to the longitudinal axis of bar 92, and slides door 56 towards its retracted position. A distance at which the door displaces depends on the length of guide tracks 86 and, preferably, is selected so that front edge 72 (FIG. 10D) of door 56 would lie substantially flush with front wall 58 of cage 14, when the door is fully retracted.

The walls of cage 14 each include a respective plurality of bars spaced, which, while extending in a horizontal or parallel plane, are spaced apart at a distance preventing the caged birds from flying out of the cage. However, the spacing between adjacent bars is not uniform. In addition to an opening formed in front wall 58 and closable by door 56, one of sidewalls 62 (FIG. 5) also has an opening 91. This opening 91 is dimensioned to receive feeder/waterer support 16, which is configured to support feeder and waterer units 20 and 18, respectively.

Figure 14A:
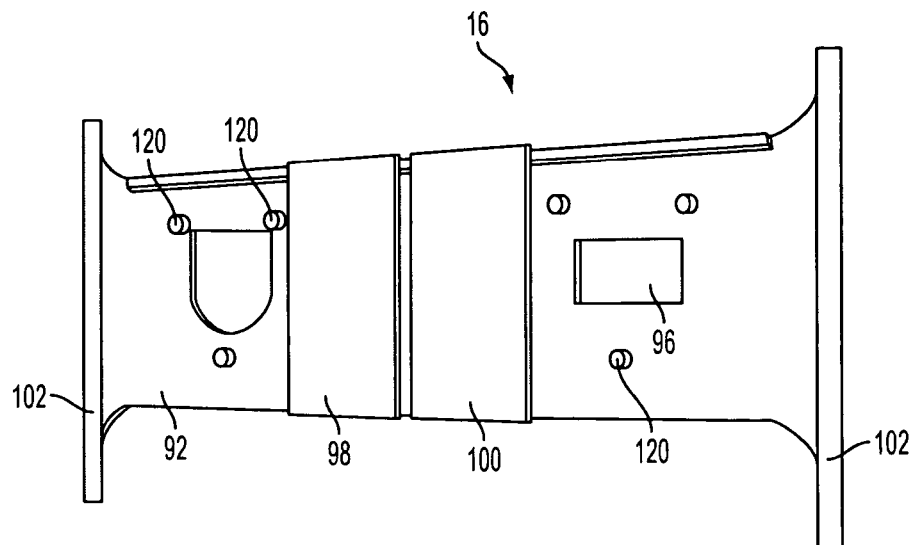
FIGS. 14A, 14B and 14C illustrate a feeder/waterer support attachable to the cage of FIG. 5.
Figure 14B:
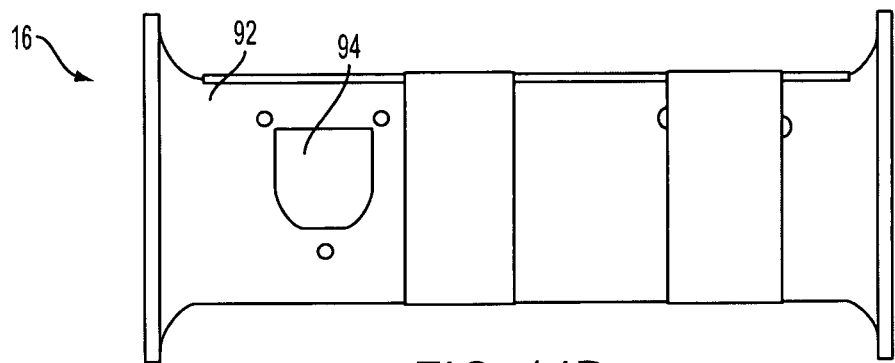
Figure 14C:
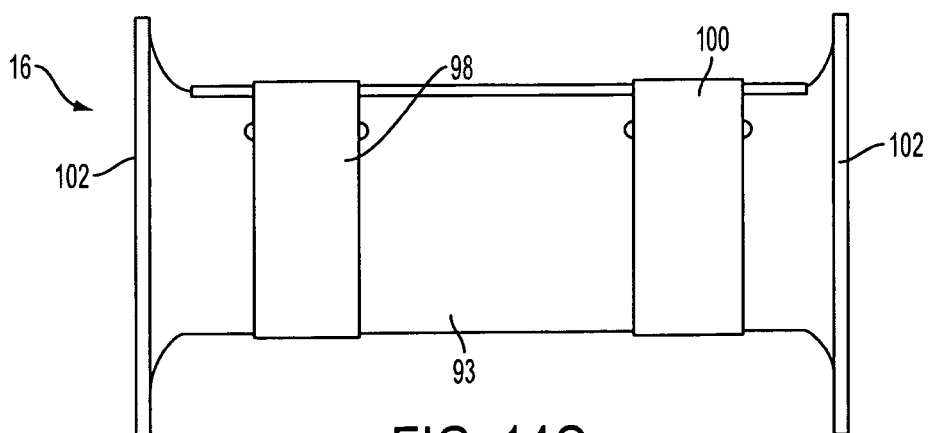

Support 16, better illustrated in FIGS. 14A, 14B and 14C, is provided with a body 93 defined between two sleeves 102, each of which is traversed by a respective one of the connecting rods 70, as shown in FIG. 1. In the mounted position, support 16 forms a continuation of sidewall 62 of cage 14 and prevents the pet birds from escaping.

Body 93 has two windows 94 and 96 capable of receiving feeder 20 and waterer 18, respectively, as will be explained below. The feeder and waterer may be any suitable feeder and waterer, respectively. Suitable feeders and waterers may be those disclosed in U.S. patent application Ser. No. 10/910,248, which is hereby incorporated by reference in its entirety.

In one embodiment where a feeder and waterer similar to that disclosed in U.S. patent application Ser. No. 10/910,248 are used, the windows are not uniformly configured because of structural differences between feeder 18 and waterer 20. Since the feeder and waterer have to be periodically dismounted from support 16 for prophylactic purposes, it is necessary to prevent the caged birds from flying through the open windows. Accordingly, support 16 is provided with shutters 98 and 100, which are slidably mounted to support's body 93 and dimensioned to close windows 94 and 96, respectively, when either one of feeder 18 and waterer 20 or both are detached from support 16.

Figure 15:
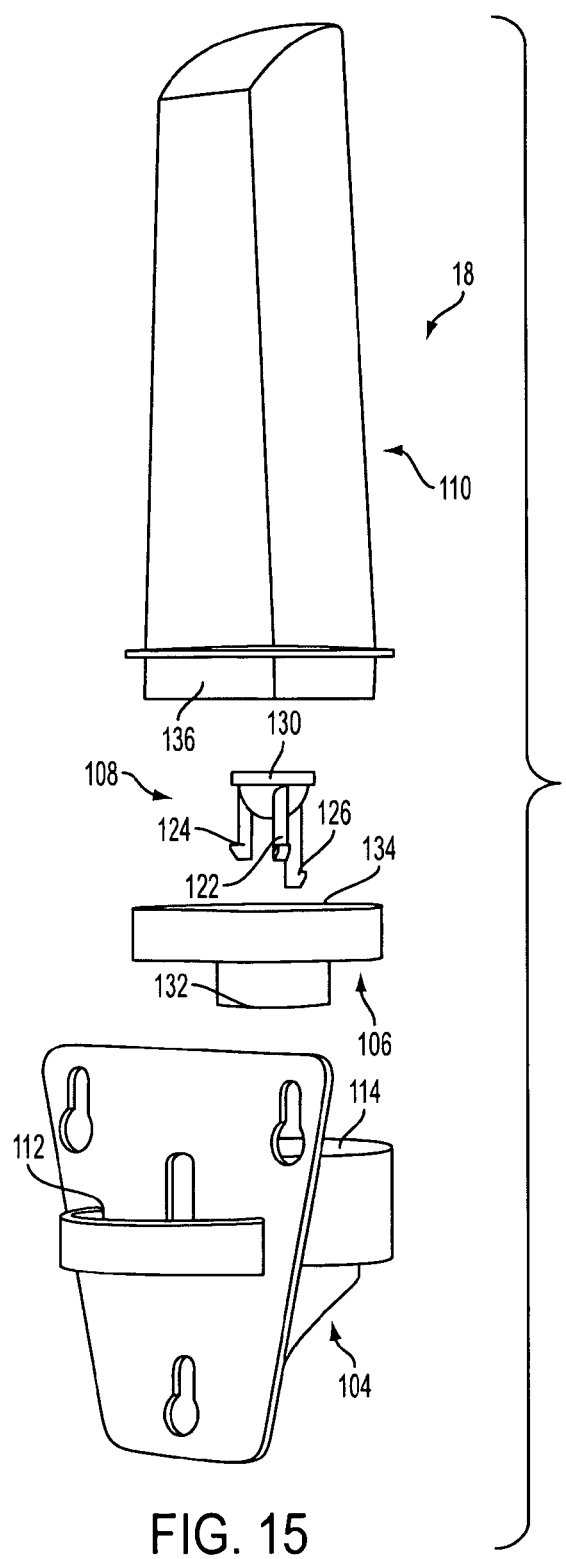
FIG. 15 illustrates an exploded view of a waterer.
Figure 16:
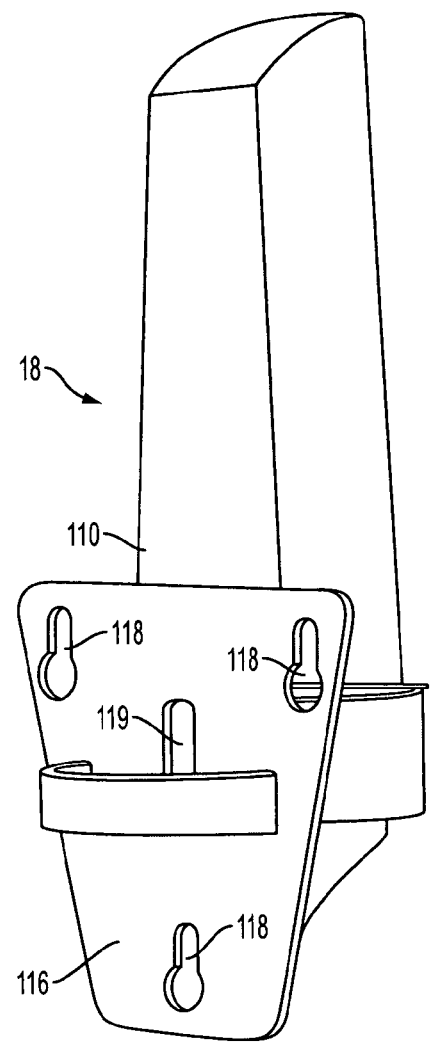
FIG. 16 illustrates an isometric view of the waterer illustrated in FIG. 15.
Figure 17:
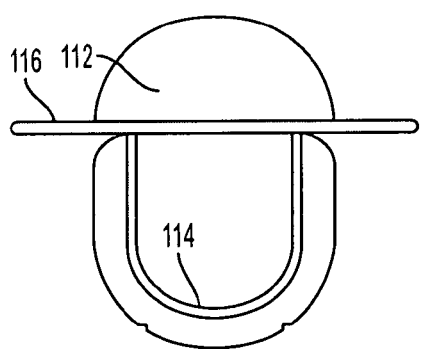
FIG. 17 illustrates a top view of the water cup of the waterer, as shown in FIGS. 15, 16.

Waterer 18, which is better illustrated in FIGS. 15, 16, and 17, is configured to provide a metered supply of water to the caged birds. Structurally, waterer 18 includes a waterer base 104 (FIG. 15), a silo base 106, which is removably received in waterer base 104, and a waterer silo 110, which can be detachably mounted atop silo base 106.

Waterer base 104 is configured with a bracket 116 (FIGS. 15 and 16) mountable to support 16, a water reservoir 114 for receiving water from waterer silo 110 and a water distributor 112, which is in fluid communication with water-receiving reservoir 114 through an opening 119. Bracket 116 has multiple keyholes 118, each of which can receive a respective fastener 120 of feeder/water support 16 (FIG. 14A), when the user inserts fasteners 120 into keyholes 118. In the mounted position, water distributor 112 extends through window 94 (FIG. 14B) of support 16 into the interior of cage 14.

Metered supply of water from waterer silo 110 through water reservoir 114 to water distributor 112 is provided by a valve 108 (FIG. 15), which has a cup-shaped portion 130 and multiple lips 122, 124 and 126. In the assembled state of waterer 18, the lips, two of which 122 and 124 are substantially uniformly-dimensioned, and a third lip 126 is larger than the other lips, protrude into water reservoir 114 and are operative to control water flow into water distributor 112, as will be explained herein below.

Cup-shaped portion 130 of valve 108 is supported in an opening, which is provided in the bottom of silo base 106, whereas legs 122, 124 and 126 extend through a flange 132, which extends downwards from the bottom of silo base 106 into water reservoir 114. Outer dimensions of silo base 106 are selected so as to allow it to slide in and out of water reservoir 114 of waterer base 104. Inner edge 134 of silo base 106 fits tightly against the outer surface of silo's bottom 136, thereby providing a reliable connection between waterer silo 110 and silo base 106.

To control water flow, longest leg 126 of valve 108 is dimensioned to press against the bottom of water reservoir 114 with a force sufficient to slightly lift cup-shaped portion 130 above the opening in silo base 106, and, thus, to form a water passage from waterer silo 110 to water reservoir 114. The rate, at which water is delivered from silo base 106 to water reservoir 114, remains uniform, because the dimensions of the water passage stay unmodified regardless of a level of water in silo base 106.

Figure 18:
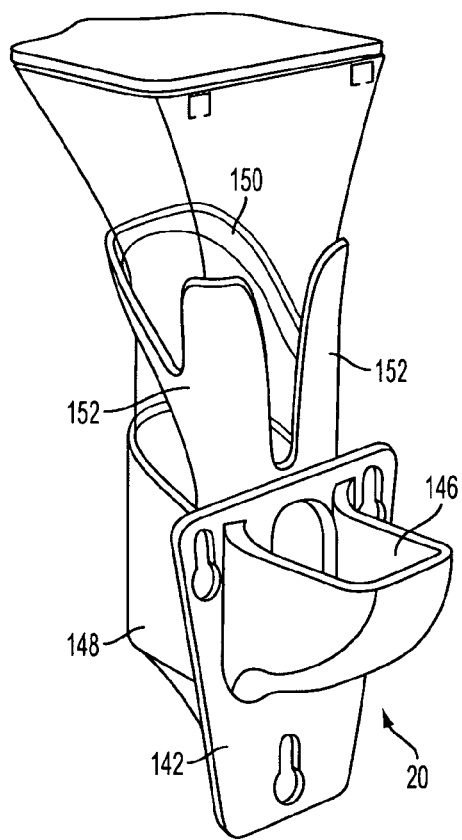
FIG. 18 illustrates an isometric view of a feeder.
Figure 19:
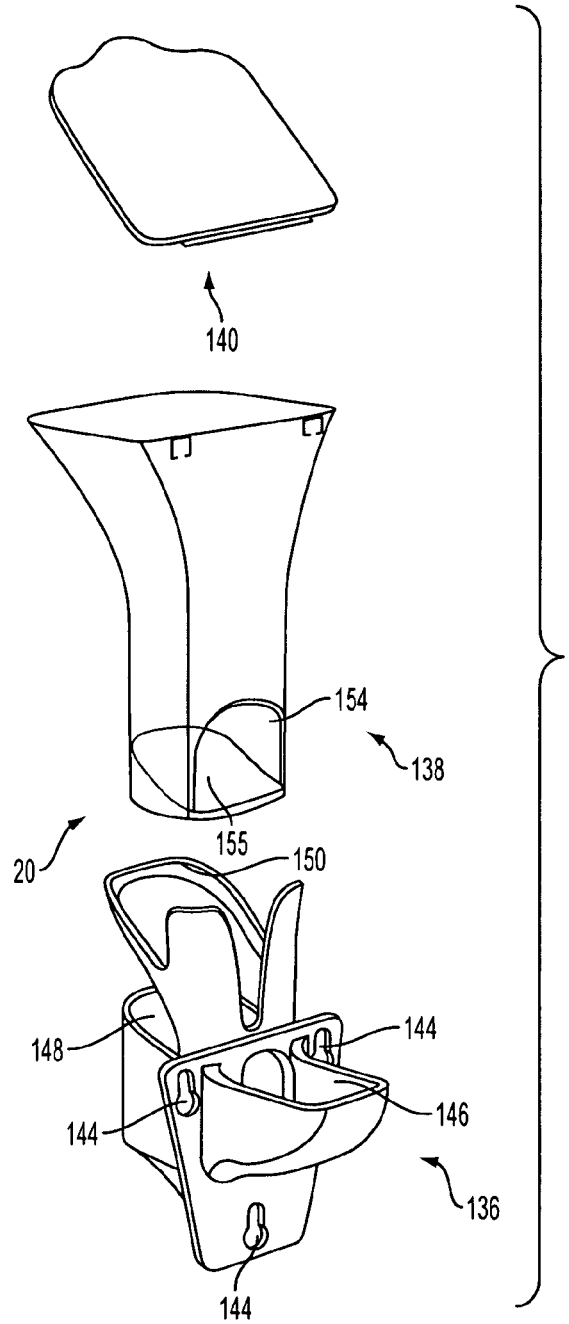
FIG. 19 illustrates an exploded view of the feeder illustrated in FIG. 18.

As shown in FIG. 19, feeder 20 is configured with a feeder base 137, silo 138, which is smoothly fit into feeder base 137, and a lid 140 for closing the food silo. Feeder base 137 is detachably mountable to support 16 (FIGS. 14A, 14B and 14C) in the same manner as disclosed above in reference to waterer 18. In particular, a bracket 142 (FIG. 18) of feeder base 137 is recessed with several keyholes 144 (FIG. 19), which are shaped and dimensioned to receive multiple fasteners 120 of support 16 (FIG. 14A). In a mounted state of feeder base 137, a food tray 146 extends through window 96 (FIG. 14A) of support 16 into the interior of cage 14. A silo support 148 (FIGS. 18, 19) for supporting silo 138 is formed on bracket 142 and extends above food tray 142 to slidably receive silo 138. To assure a stable position of silo 138 in silo support 148, silo base 137 has a harness 150 supporting one side of silo 138 and a pair of spaced fingers 152 attached to the harness and supporting the opposite side of the silo.

To deliver food to food tray 146 (FIG. 19), the user swings lid 140 in an open position and loads silo 138 with food, which falls down on a slanted bottom 155 of the silo. Upon reaching the bottom, food continues to slide into food tray 146 through an opening 154, which formed in the lower portion of the peripheral wall of silo 138 and opens into food tray 146.

Figure 20:
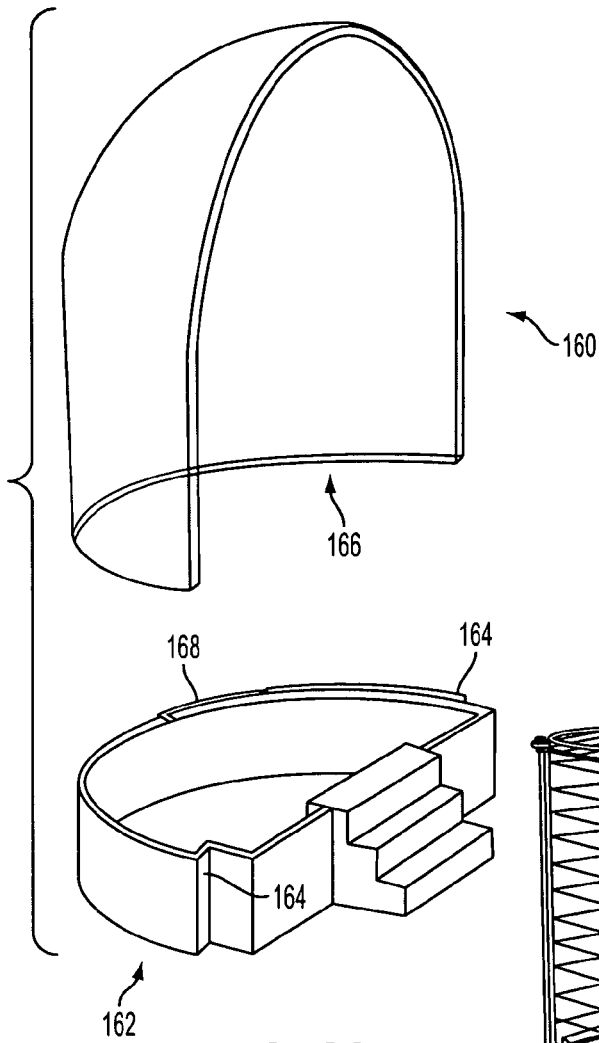
FIG. 20 illustrates an exploded view of a birdbath.
Figure 21:
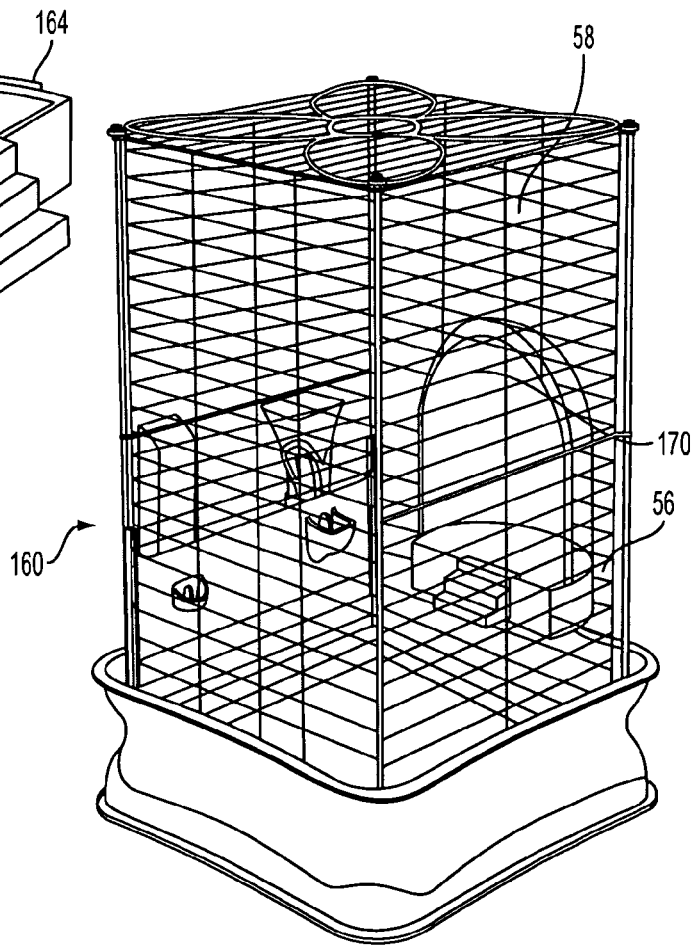
FIG. 21 illustrates the birdbath of FIG. 20 mounted to the cage illustrated in FIG. 5.

Birdcage assembly 10 can be manufactured and sold as a kit including, in addition to assembly 10, a variety of accessories, such as a birdbath 160, which is illustrated in FIGS. 20 and 21. Birdbath 160 is so shaped and dimensioned so that when it is mounted to cage 14, the bath completely closes an opening 170 of front wall 58 of cage 14, which is typically covered by door 56. Accordingly, to install birdbath 160 in cage 14, door 56 is initially swung in the fully open position, where it receives and supports birdbath. Thereafter, door 56 and birdbath 160 are moved to the retracted position of the door, as explained above and illustrated in FIG. 10D.

Birdbath 160 is configured with a bath base 162 having two cornered regions 164, which press against front wall 58 of cage 14 in a predetermined installed position of birdbath. In addition, birdbath 160 also includes a hood 166, the bottom edge of which can be removably received in a trough 168, which is formed in the upper edge of bath base 162. Typically, the bath base and wall are coupled to one another before the birdbath is installed in cage 14. Thus, when bath base 162 reaches the predetermined installed position within cage 14, the hood 166 will completely close the rest of the opening of front wall 58.

Figure 22:
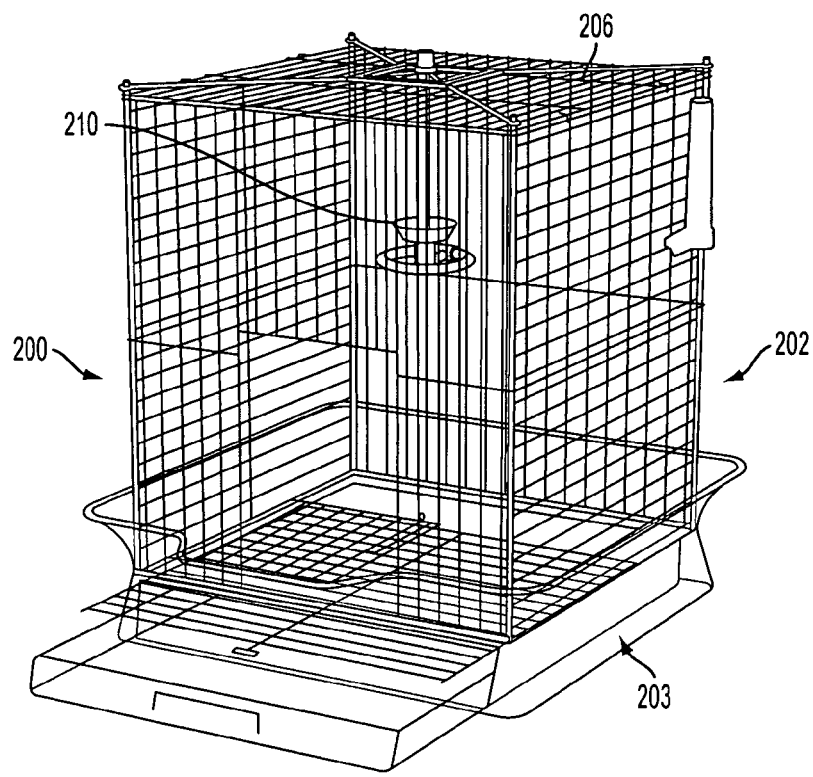
FIG. 22 illustrates an isometric view of the birdcage configured in accordance with a further embodiment of the invention.
Figure 23:
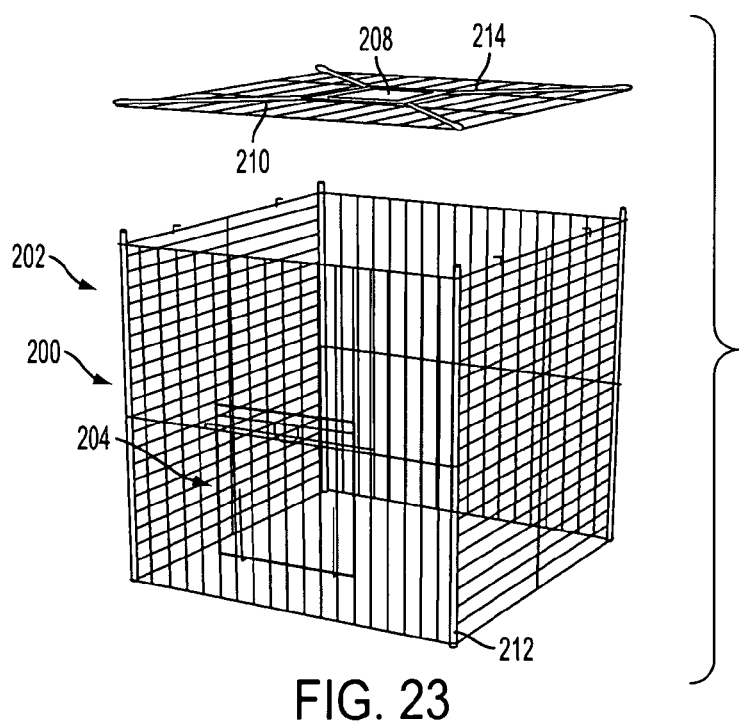
FIG. 23 illustrates an exploded view of the cage portion of the birdcage illustrated in FIG. 22.

Turning now to FIGS. 22 and 23, a birdcage 200 is configured in accordance with a further embodiment of the present invention. While many details of birdcage 200 (FIG. 22), such as a cage 202, a base 203 and door assembly 204, are designed similarly to analogous details of birdcage 10, a feeder 210 associated with birdcage 200 is uniquely structured and equally uniquely suspended in cage 202.

Watching birds feed is fun. When a feeder is placed close to one of the cage's walls, it may restrict the view of birdwatchers. Accordingly, as shown in FIG. 22, feeder 210 is suspended from a topside 206 of cage 202 and occupies a substantially central position within birdcage 200. Due to its structure, as is discussed in detail below, people can clearly see the birds in feeder 210 from any angle.

Figure 24A:
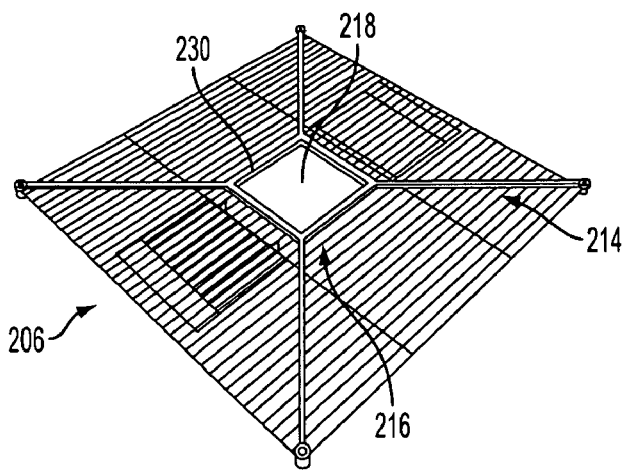
FIGS. 24A, 24B and 24C illustrate a plan view of the topside of the cage, as shown in FIGS. 22 and 23 and provided with a feeder door, which is shown in open, semi-closed and closed positions, respectively.

Feeder 210 extends into cage 202 through a central opening 208 (FIG. 23) formed in topside 206 and is suspended between the top and bottom of the cage at the desirable distance. Topside 206 is removably attached to the sidewalls of cage 202 by shafts 212 (FIG. 23) and has a support cross 214 (FIGS. 23 and 24A), which is fixed to the topside and has two functions. First, it supports feeder 210, and second, it provides birdcage 200 with a decorative element.

Figure 24B:
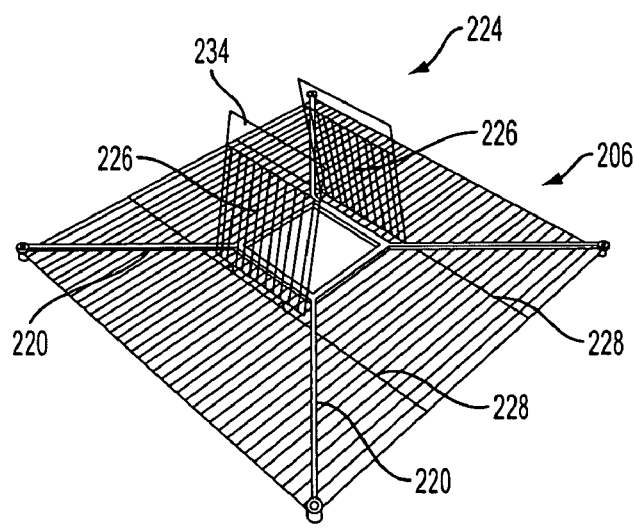

Formed in the center of support cross 214 is a rim 216 (FIG. 24A), preferably, having the same cross-section as opening 208 of topside 206. As illustrated, endless rim 216 has a rectilinear cross-section and defines a respective opening 218, which, upon coupling support cross 214 to topside 206, lies atop central opening 208 of the topside providing, thus, a passage into cage 202. In addition, support cross 214 has four arms 220 (FIG. 24B) each connecting a respective pair of corners of rim 216 and topside 206 and provided with a respective eyelet 222 (FIG. 24C) for removably receiving shaft 212 (FIG. 23).

Figure 24C:
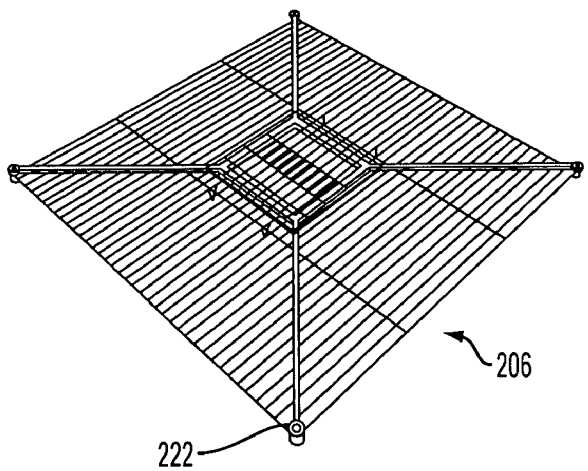
Figure 25:
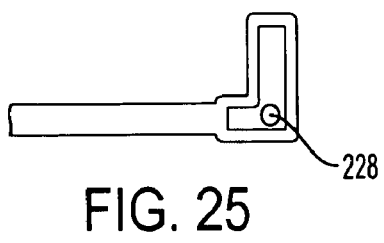
FIG. 25 illustrates the hinge assembly of the door shown in FIGS. 24A, 24B and 24C.

Upon removing feeder 210 from cage 202, opening 218 is closed by a door assembly 224 (FIG. 24B) preventing the birds from escaping the cage. Door assembly 224 includes two identical halves 226 each pivotally mounted on a respective topside bar 228 (FIGS. 24B and 25) so as to swing towards and away from one another between an open position (FIG. 24A) and a closed position (FIG. 24C). Preferably, each of door haves 226 is slightly wider than opening 218 of support cross 214, so that when the first of two halves is brought to a closed position, bars 230 (FIG. 24A) of rim 216 support this half, whereas the other half is swung on top of the first half. The rear side of each door half 226 is pivotally mounted on a respective one of topside bars 228 by means of an L-shaped hinge 232 (FIG. 25) allowing the door halves not only to rotate on bars 228, but also move linearly relative these bars and perfectly overlap one another in the closed position of door assembly 224. In addition, each door half 226 is provided with a handle 234 that may be used by the user during transportation of the assembled birdcage.

Figure 26A:
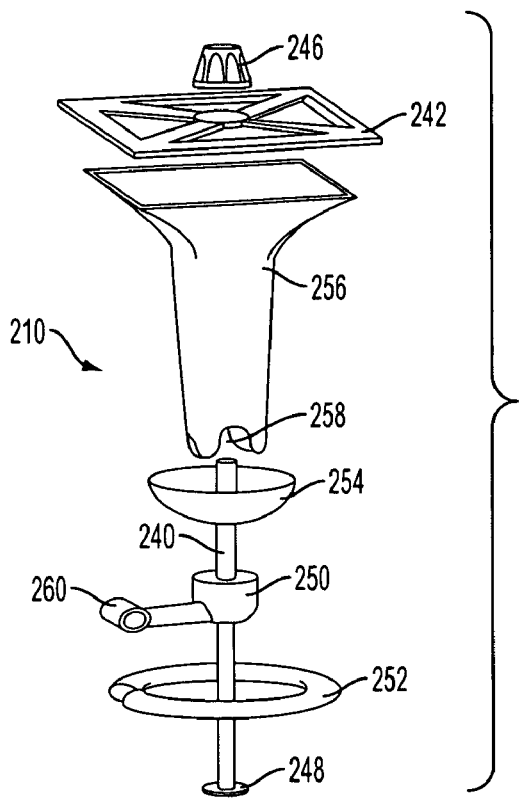
FIGS. 26A and 26B illustrate exploded and isometric views, respectively, of the feeder unit of the birdcage of FIG. 21.
Figure 26B:
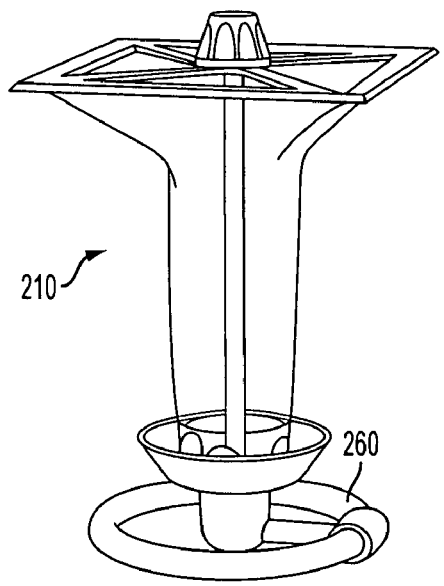

To mount feeder 210, better illustrated in FIGS. 26A and 26B, the user initially assembles it before inserting through and suspending it on support cross 214, as shown in FIG. 22. Each of the feeder components, include a perch 252, perch support 250, feed cup 254, silo 256, support frame 242 and nut 246 (FIG. 26A), is provided with a respective central opening traversed by a long screw 240, which centers the components along a screw axis. The bottom end of screw 240 is enlarged to prevent the feeder components from falling of the screw. The top end of screw 240 extends above support frame 242 and threadedly engages nut 246, which is tightened on the top end by the user to secure all of the components on the screw.

The user then inserts assembled feeder 210 through opening 218 of support cross (FIG. 24B) until support frame 242, which is slightly larger than rim 230 of support cross 214, rests tightly on top of this rim. In this position of frame 242, the open top region of silo 256, which flares upwards, reliably closes the passage into cage 202 preventing, thus, the pet birds from flying out. The bottom of silo 256 tightly fits in feed cup 254, which receives food from the silo through a plurality of silo's bottom recesses 258. Finally, perch 252, having a substantially circular cross-section, is provided with a gap defining, thus, two spaced apart ends, each of which is configured to fit in a respective hole of a perch holder 260, which bridges the gap between the perch's ends and allows the pet birds all around feed cup 254.

Preferably, all components of feeder 210 are made from plastic. To provide the bird owners with an unobtrusive view of eating birds or to allow certain bird species that are way when unable to view the surrounding area while feeding, silo 256 may be made from transparent material.

Figure 27A:
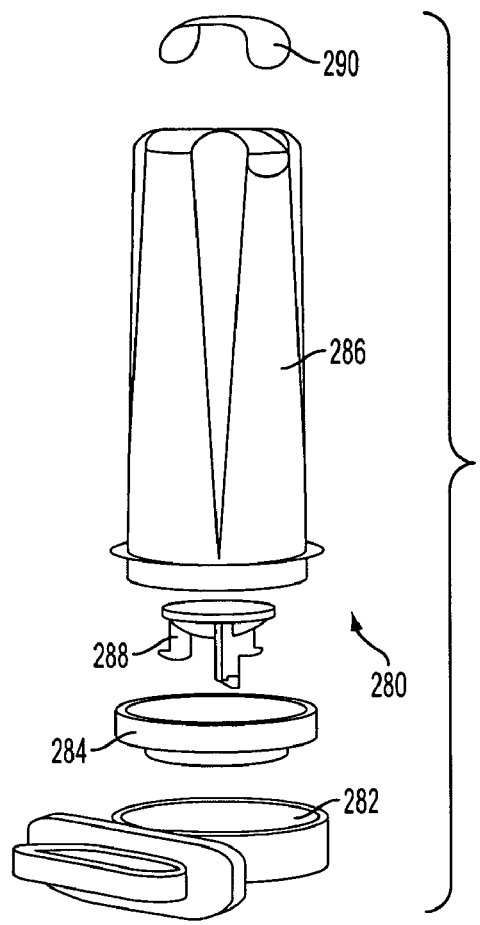
FIGS. 27A and 27B illustrate exploded and isometric views, respectively, of a waterer unit of the birdcage of FIG. 21.
Figure 27B:
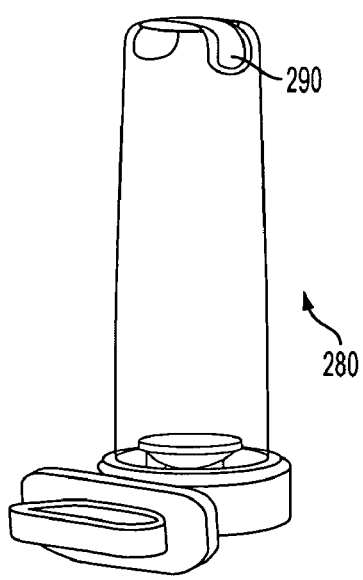

A waterer 18, shown in FIGS. 27A and 27B, is structured similarly to waterer 18, which can be seen in FIGS. 18A and 18B, and includes a waterer base 282, a silo base 284, which is removably received in waterer base 282, and waterer silo 286, which can be detachably mounted atop silo base 284. Waterer base 282 is configured to fit between horizontal bars of cage 202 and slip down to lock into place. In addition, waterer 280 has a finger grip 290 made from a soft flexible material molded over or bonded to the top of silo 286.

Embodiments of the inventive birdcage assembly have been described here for illustration purposes only. Neither the specific embodiments of the invention as a whole, nor those of its features limit the general principles underlying the invention. In particular, the invention is not limited to any particular size or shape of the birdcage, wire grade of the cage's bars, as well as to parallel or horizontal bars. The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and it is not intended that the invention should be limited to any such embodiments, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A birdcage comprising:
a cage having a removable bottom wall; and
a base adapted to receive and support the cage,
wherein the base includes a removable tray adapted to be slid into and out of the base,
wherein the removable bottom wall is adapted to be slid into and out of the base above the removable tray,
wherein the base includes side walls that extend out beyond a perimeter of the cage and are flared upwardly and outwardly relative to the cage so as to be disposed to catch debris expelled from within the cage,
wherein the cage further includes a top wall and side walls, and wherein at least one of the top wall and side walls include an opening receiving a support member, and wherein the support member removeably supports at least one of a waterer and a feeder;
wherein the cage includes an opening in one of the side walls other than a door, and wherein the support member includes a window through which a waterer may provide water to a bird in the birdcage; and
wherein the support member includes a shutter adapted to block the window when the one of the feeder and when the waterer is not present.

2. A birdcage comprising:
a cage having a removable bottom wall; and
a base adapted to receive and support the cage,
wherein the base includes a removable tray adapted to be slid into and out of the base,
wherein the removable bottom wall is adapted to be slid into and out of the base above the removable tray,
wherein the base includes side walls that extend out beyond a perimeter of the cage and are flared unwardly and outwardly relative to the cage so as to be disposed to catch debris expelled from within the cage,
wherein the cage further includes a top wall and side walls, and wherein at least one of the top wall and side walls include an opening receiving a support member, and wherein the support member to removeably supports at least one of a waterer and a feeder; and
wherein the cage includes an opening in one of the side walls other than a door, and wherein the support member includes a plurality of windows through which a feeder may provide food, and a waterer may provide water, to a bird in the birdcage.

3. The birdcage of claim 2 wherein the support member is adapted to detachably support a feeder and a waterer on an exterior area of the birdeage, wherein the feeder is adapted to supply food through a first window and to block the first window when present, and wherein the waterer is adapted to supply water through a second window and to block the second window when present.

4. The birdeage of claim 2 wherein the support member includes a plurality of shutters, each shutter adapted to block a window when either the feeder or the waterer is not present.

5. A birdeage comprising:
a cage having a removable bottom wall; and
a base adapted to receive and support the cage,
wherein the base includes a removable tray adapted to be slid into and out of the base,
wherein the removable bottom wall is adapted to be slid into and out of the base above the removable tray,
wherein the base includes side walls that extend out beyond a perimeter of the cage and are flared upwardly and outwardly relative to the cage so as to be disposed to catch debris expelled from within the cage,
wherein the cage further includes a top wall and side walls, and wherein at least one of the top wall and side walls include an opening receiving a support member, and wherein the support member removeably supports at least one of a waterer and a feeder;
wherein the cage includes an opening in the top wall other than a bird egress door, and wherein the support member includes a support frame adapted to support a at least one of a feeder device and a waterer device such that the at least one device blocks the opening in the top wall when it is present; and
wherein the opening in the top wall is blocked by a door assembly when at least one device is not present.

6. The birdeage of claim 5 wherein the door assembly includes two halves each pivotally mounted on the top wall adjacent the opening so as to swing towards and away from one another between an open position and a closed position.

7. The birdcage of claim 6 wherein each of the two halves include a handle such that when the door assembly is partially open, the handles may be used to support the cage while it is lifted.

8. A birdeage comprising:
a cage having a removable bottom wall; and
a base adapted to receive and support the cage,
wherein the base includes a removable tray adapted to be slid into and out of the base,
wherein the removable bottom wall is adapted to be slid into and out of the base above the removable tray,
wherein the base includes side walls that extend out beyond a perimeter of the cage and are flared upwardly and outwardly relative to the cage so as to be disposed to catch debris expelled from within the cage,
wherein the cage further includes a top wall and side walls, and wherein at least one of the top wall and side walls include an opening receiving a support member, and wherein the support member to removeably supports at least one of a waterer and a feeder;
wherein the cage includes an opening in the top wall other than a bird egress door, and wherein the support member includes a support frame adapted to support a at least one of a feeder device and a waterer device such that the at least one device blocks the opening in the top wall when it is present;

wherein the support frame includes a support cross, and wherein the at least one device hangs inside the birdcage from the support frame; and wherein the at least one device includes a silo, and wherein the silo is shaped such that the silo flares upwards and outwards a sufficient amount so as to block the opening in the top wall when the at least one device hangs inside the bird cage.

9. A birdcage comprising:

a cage having a removable bottom wall; and a base adapted to receive and support the cage, wherein the base includes a removable tray adapted to be slid into and out of the base, wherein the removable bottom wall is adapted to be slid into and out of the base above the removable tray, wherein the base includes side walls that extend out beyond a perimeter of the cage and are flared upwardly and outwardly relative to the cage so as to be disposed to catch debris expelled from within the cage, and wherein the base includes a nose portion that extends out from the birdcage below a door of the birdcage and is adapted to support the door when the door is in an open position.

10. A door assembly for a birdcage comprising:

a door adapted to be pivotally mounted to a birdcage at an opening in a wall of the birdcage and configured to provide access into an interior of the birdcage;

a pinch latch assembly mounted to the door and adapted to lock the door in a closed position;

a nose formed in a base of the birdcage and adapted to support the door when the door is in a fully opened position; and at least two guide tracks disposed on the door and adapted to direct the door into a retracted position in response to a force being applied to the door when fully opened, the force being applied toward a center of the birdcage.

11. The door assembly of claim 10 wherein the pinch latch assembly includes two opposing arms adapted to each be concurrently pivoted toward each other about a respective inner end by a user so that respective outer ends of each arm are displaced sufficiently to disengage from a cross-bar fixedly mounted to the wall of the birdcage.

12. A method comprising:

providing a cage having a removable bottom wall; and supporting the cage in a base adapted to receive and support the cage, wherein cleaning of the cage is performed by removing a tray adapted to be slid into and out of the base, wherein cleaning of the cage is further performed by removing the bottom wall which is adapted to be slid into and out of the base above the removable tray, and wherein cleaning of an area around the cage is avoided by catching debris expelled from within the cage in side walls of the base that extend out beyond a perimeter of the cage and are flared upwardly and outwardly relative to the cage further comprising mounting a removable support member adjacent an opening in the birdcage, wherein the support member is adapted to removeably support at least one of a waterer and a feeder;

wherein mounting a removable support member includes mounting a removable support member having a window through which a waterer may provide water to a bird in the birdcage and wherein the mounting is adjacent an opening in a side wall wherein the opening is other than a door; and further comprising closing a shutter of the window to block the window when a waterer is not present.

13. A method comprising:

providing a cage having a removable bottom wall; and supporting the cage in a base adapted to receive and support the cage, wherein cleaning of the cage is performed by removing a tray adapted to be slid into and out of the base, wherein cleaning of the cage is further performed by removing the bottom wall which is adapted to be slid into and out of the base above the removable tray, and wherein cleaning of an area around the cage is avoided by catching debris expelled from within the cage in side walls of the base that extend out beyond a perimeter of the cage and are flared upwardly and outwardly relative to the cage;

further comprising mounting a removable support member adjacent an opening in the birdcage, wherein the support member is adapted to removeably support at least one of a waterer and a feeder;

wherein mounting a removable support member includes mounting a removable support member having a plurality of windows through which at least a waterer may provide water and a feeder may provide food to a bird in the birdcage and wherein the mounting is adjacent an opening in a side wall wherein the opening is other than a door.

14. The method of claim 13 further including mounting a detachable waterer and a detachable feeder to the support member on an exterior area of the birdcage wherein the waterer is adapted to supply water through a first window and to block the first window and wherein the feeder is adapted to supply food through a second window and to block the second window.

15. The method of claim 13 further comprising closing a shutter of each of the plurality of windows to block the windows when a waterer an a feeder are not present.

16. A method comprising:

providing a cage having a removable bottom wall; and supporting the cage in a base adapted to receive and support the cage, wherein cleaning of the cage is performed by removing a tray adapted to be slid into and out of the base, wherein cleaning of the cage is further performed by removing the bottom wall which is adapted to be slid into and out of the base above the removable tray, and wherein cleaning of an area around the cage is avoided by catching debris expelled from within the cage in side walls of the base that extend out beyond a perimeter of the cage and are flared upwardly and outwardly relative to the cage;

further comprising mounting a removable support member adjacent an opening in the birdcage, wherein the support member is adapted to removeably support at least one of a waterer and a feeder; and hanging a feeder within the birdcage from the support member through an opening in a top wall of the birdcage wherein a silo of the feeder is dimensioned to block the opening.

17. The method of claim 16 further comprising adding food to the feeder without removing the feeder from the birdcage.

18. The method of claim 16 further comprising removing the feeder and closing a door assembly adapted to block the opening when the feeder is not present wherein closing the door assembly includes moving two halves, each pivotally mounted on the top wall adjacent the opening so as to swing towards and away from one another between an open position and a closed position, to the closed position.

19. The method of claim 18 further comprising removing the feeder and carrying the birdcage by handles attached to the door assembly.

20. A method comprising:
providing a cage having a removable bottom wall; and
supporting the cage in a base adapted to receive and support the cage,
wherein cleaning of the cage is performed by removing a tray adapted to be slid into and out of the base,
wherein cleaning of the cage is further performed by removing the bottom wall which is adapted to be slid into and out of the base above the removable tray, and
wherein cleaning of an area around the cage is avoided by catching debris expelled from within the cage in side walls of the base that extend out beyond a perimeter of the cane and are flared upwardly and outwardly relative to the cage; and
further comprising:
unlocking a pinch latch securing a door of the birdcage;
opening the door of the birdcage;
resting the door on a nose of the base;
recessing the door under the cage into the base; and
installing a bird bath accessory adjacent where the door was closed.

21. A birdcage comprising:
a collapsible cage having an opening adapted to be coupled to a support wherein the support is adapted to support at least one of a feeder and a waterer so that a bird in the cage may be provided at least one of food and water while being blocked from exiting the cage via the opening; and
a base adapted to receive and support the cage, wherein the base includes side walls that extend out beyond a perimeter of the cage and are flared upwardly and outwardly relative to the cage so as to be disposed to catch debris expelled from within the cage:
further comprising a plurality of connecting rods securing the cage from collapsing, where the cage includes at least two eyelet formations and a socket in the base, the at least two eyelet formations and the socket in the base receiving a connecting rod so that once the connecting rod is inserted in the at least two eyelet formations and the socket, the cage is restricted from being collapsed.

* * * * *